(12) United States Patent
Lee et al.

(10) Patent No.: US 6,859,297 B2
(45) Date of Patent: Feb. 22, 2005

(54) ELECTROCHROMIC COUNTER ELECTRODE

(75) Inventors: Se-Hee Lee, Lakewood, CO (US); C. Edwin Tracy, Golden, CO (US); J. Roland Pitts, Lakewood, CO (US); Gary J. Jorgensen, Pine, CO (US)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 10/480,014

(22) PCT Filed: Aug. 7, 2001

(86) PCT No.: PCT/US01/24699
§ 371 (c)(1),
(2), (4) Date: Dec. 4, 2003

(87) PCT Pub. No.: WO03/014254
PCT Pub. Date: Feb. 20, 2003

(65) Prior Publication Data
US 2004/0150867 A1 Aug. 5, 2004

(51) Int. Cl.⁷ .......................... G02F 1/153; G02F 1/00
(52) U.S. Cl. .................. 359/273; 359/321; 252/583
(58) Field of Search ................. 359/265, 267, 359/269, 273, 275, 320–322; 252/583, 600

(56) References Cited

U.S. PATENT DOCUMENTS

| | | | |
|---|---|---|---|
| 4,365,870 A | 12/1982 | Morita et al. | 359/269 |
| 4,832,468 A | 5/1989 | Ito et al. | 359/273 |
| 4,889,414 A | 12/1989 | Rauh et al. | 359/273 |
| 5,105,303 A | 4/1992 | Ilhage | 359/273 |
| RE34,469 E | 12/1993 | Cogan et al. | 359/269 |
| 5,724,187 A * | 3/1998 | Varaprasad et al. | 359/608 |
| 5,777,780 A | 7/1998 | Terada et al. | 359/273 |
| 5,831,760 A | 11/1998 | Hashimoto et al. | 359/273 |
| 6,020,987 A | 2/2000 | Baumann et al. | 359/273 |
| 6,111,684 A | 8/2000 | Forgette et al. | 359/267 |
| 2003/0227664 A1 * | 12/2003 | Agrawal et al. | 359/269 |

FOREIGN PATENT DOCUMENTS

| | | |
|---|---|---|
| EP | 0 730 189 A | 9/1996 |
| JP | 59180506 | 10/1984 |

OTHER PUBLICATIONS

PCT International Search Report, PCT/US01/24699, Oct. 1, 2001.
Advances in Image Pickup and Display, Vol 5, ed. "Ion–Insertion Electrochromic Displays," B. Kazan, Academic Press, 1982, pp. 83–136.
Lampert, C.M., "Electrochromic Materials and Devices for Windows," Solar Energy Materials, 11 (1984), pp. 1–27.
Decker, F. et al., "The Electrochromic Process in Non–Stoichiometric Nickel Oxide Thin Film Electrodes," Electrochima Acta, Vol 37, 6, (1992), pp. 1033–1038.
Lee, S–H. et al., "Electrochromic Behavior of Ni–W Oxide Electrodes," Solar Energy Materials and Solar Cells 39 (1995) pp. 155–166.
Lee, S–H. et al., "Characterization of Ni–W Oxide Thin Film Electrodes," Solid State Ionics 109 (1998) pp. 303–310.

* cited by examiner

*Primary Examiner*—Georgia Epps
*Assistant Examiner*—William Choi
(74) *Attorney, Agent, or Firm*—Paul J. White

(57) ABSTRACT

The present invention discloses an amorphous material comprising nickel oxide doped with tantalum that is an anodically coloring electrochromic material. The material of the present invention is prepared in the form of an electrode (200) having a thin film (202) of an electrochromic material of the present invention residing on a transparent conductive film (203). The material of the present invention is also incorporated into an electrochromic device (100) as a thin film (102) in conjunction with a cathodically coloring prior art electrochromic material layer (104) such that the devices contain both anodically coloring (102) and cathodically coloring (104) layers. The materials of the electrochromic layers in these devices exhibit broadband optical complimentary behavior, ionic species complimentary behavior, and coloration efficiency complimentary behavior in their operation.

24 Claims, 8 Drawing Sheets

Coloration Efficiency (CE):
$$CE = \Delta OD/\Delta Q = Log(T_b/T_c)/ \Delta Q$$

Coloration Efficiency (CE):

$$CE = \Delta OD/\Delta Q = \text{Log}(T_b/T_c)/\Delta Q$$

Ni-Ta oxide film: 120 nm
Charge insertion: 15 mC/cm$^2$

ELECTROCHROMIC COUNTER ELECTRODE

CONTRACTUAL ORIGIN OF THE INVENTION

The United States Government retains fully paid licensing rights in this invention pursuant to Contract No. DE-AC-36-99GO10337 between the United States Department of Energy and The National Renewable Energy Laboratory, a Division of Midwest Research Institute.

TECHNICAL FIELD

This invention relates to anodically coloring electrochromic materials, electrodes made therefrom, and their use in electrochromic devices.

BACKGROUND ART

Electrochromic materials change optical properties upon the injection of charge or charge carriers into the material, with the subsequent movement of counterions or electrons to balance the charge in the material. The mechanism underlying electrochromic behavior is not well elucidated, and several theories are expounded in reviews of the subject appearing in Advances in Image Pickup and Display, vol. 5, ed. B. Kazan, Academic Press, 1982, chapt. 5, and Display Devices, ed. J. I. Pankove, Springer-Verlag, NY, Berlin, Heidelberg, 1980. It is believed that the effect primarily depends upon electron or hole charge injection into the electrochromic material, with the charge carrier being dependent upon the nature of the material. Although counter ion movement is important to charge balance, it is not believed that coloring of the material is primarily dependent upon the nature of the counter ion. In several investigations using a given electrochromic material, both protons and alkali metal cations yielded comparable color change and charge dependent coloration. On this basis, substitution of the cation injected within an electrochromic material seems not to have an effect on the quality of the color change in a given electrochromic material. It has been observed that different counter ions do effect the time required for a given electrochromic material to achieve a given level of coloration change.

Both inorganic and organic materials have been identified that exhibit electrochromic behavior. Optical changes in electrochromic materials include a change from one color to another, a change from transmissive to reflective, and a change from transparent to opaque. In the electrochromic materials literature the terms often applied to the two states are "bleached" and "colored," which refer respectively to a condition of low optical density and high optical density, even though some materials have a "color" when in the low optical density state. For the purposes of this document, a material in the "bleached" state is alternatively described as being in a "bleached," "low optical density," "transparent," or "high transmittance" state. In the same manner, for the purposes of this document, a material in the "colored" state is described alternatively as being "colored", "opaque", or in a "high optical density" or "low transmittance" state. Again, for the purposes of this document, the process of changing from a "transparent" to an "opaque" state will be referred to as "coloring" and the process of changing from an "opaque" to a "transparent" state will be referred to as "bleaching". Additionally, there are both cathodically and anodically coloring electrochromic materials (described in detail below).

For applications in which transparency is required, such as optical shuttering or switching, both organic and inorganic electrochromic materials have been employed, but for large devices such as architectural windows, electrochromic materials made from inorganic metal oxides are generally employed. Both anodically coloring and cathodically coloring electrochromic metal oxides have been identified. Anodically coloring electrochromic materials change from a low optical density (or "bleached") state to a high optical density (or "opaque") state when electrons are withdrawn from the material ("holes" or positive charge is "injected" into the material). In anodically coloring materials, coloring is accompanied by a migration of cations out of the material to balanced charge (holes) injected into the material.

Cathodically coloring electrochromic materials change from a low optical density (or "bleached") state to a high optical density (or "opaque") state when electrons are injected into the material. In cathodically coloring materials, coloring is accompanied by a concomitant movement of cations into the material to balance charge injected into the material.

On a fundamental level, an electrochromic device may be thought of as a battery, wherein electrons and holes are moved within each "half cell" associated with the anode and the cathode of an electrochromic device. To execute the transition from low and high optical density states, an electromotive force (EMF) such as an external battery is required to charge the electrochromic "battery" by forcing charge to move within the device, driving the change in the electrochromic materials. The "charged" electrochromic device will, at least for the short term, remain in that state until it is "discharged" by reversing the EMF that drove the change or by short circuiting the device. Generally to speed the change and to insure that the device returns to the lowest density achievable, it is preferable to drive the reverse change with a reversal of EMF rather than by simply shorting the device.

In the case of an anodically coloring material, a material is cycled from the bleached state to the colored state by connecting it "anodically" to a DC (direct current) source such that it supplies electrons to the D.C. source (behaves as an anode). This is to say that in an anodically coloring electrochromic material, the conductor in electrical contact with the electrochromic material is connected to the cathode of a battery (or other emf source) to drive the material to change to a colored state. The battery takes up electrons from the electrochromic material. Of necessity, the counter-electrode of such a device must be connected to the anode of the battery.

Bleaching in such a case is accomplished by reversing the electrode connection of the device to the emf source. In such a case, the electrode in contact with the "anodically coloring" electrochromic material would be connected to the battery anode. The electrochemical material would serve as an electron sink, and again of necessity the counter electrode would be connected to the battery cathode, serving as a source of electrons. This scheme is reversed for a cathodically coloring electrochromic material.

Furthering the analog between an electrochromic device and a battery, the anode and cathode of the electrochromic material must be isolated from each other with respect to electron movement. If the anode and cathode are well isolated, electrochromic coloring persists after the driving emf is removed from the device.

Unlike a battery, electrochromic devices preferably operate on a minimum of charge movement to effect a full change from bleached to colored, whereas it is required that a battery store the maximum charge/unit mass before it is saturated.

Electrochromic devices are generally layered structures. FIG. 1 shows schematically from top to bottom the arrangement of the layers of a typical electrochromic device 107. Generally, the top-most layer 106 is a transparent support. Deposited on the lower face of the support, as it is depicted, is a first conductor 105, made from a transparent conductive material. Onto the exposed side of this first conductor is usually deposited a layer of electrochromic material 104. The exposed side of this electrochromic material is contacted with an electrolyte 103.

The exposed side of the electrolyte layer is in contact with a second electrode layer (102), which, depending upon the device may or may not be electrochromic. A second electrically conducting layer 101 is in contact with electrode layer 102, which, depending upon the use to which the electrochromic device may be put, may or may not be transparent. Many devices include a second protective layer, shown as layer 100, which may or may not be transparent depending upon the use of the device.

The counter ion species necessary to balance charge movement within electrochromic materials is supplied by the electrolyte 103, an ionic conductor in contact with the electrode (not shown), the counter-electrode 102, or a source of ion dispersed within the electrolyte (not shown). It is important to note that the intervening layers between electrodes must at some point constitute a barrier to electron flow between the electrodes (while providing an ion conduction pathway) or the device will short circuit and decolorize upon removal of the DC current source. In some electrochromic devices a layer specifically designed to be an ion conductor and an electron barrier is included. Such devices generally employ liquid electrolytes between the electrochromic layers and are not used in monolithic electrochromic devices such as those of the present invention. Construction of electrochromic devices using a variety of electrochromic materials, electrolytes, electrodes, and device construction methods have been reviewed in U.S. Pat. No. 6,020,987 to Baumann, et. al. and U.S. Pat. No. 6,111,684 to Forgette et al.

In devices which are designed to transmit light, the front and back electrodes are both made of a transparent conductor. An example of such a transparent conductor is doped tin oxide glass, of which indium doped tin oxide glass is the most widely used. In such devices the electrolyte and the source/sink of counter ion (if one is used) are also transparent. Electrolytes employed in electrochromic devices are well known in the electrochemical arts. Devices have been fabricated using both protic and aprotic medium in both liquids, polymers, and solid solutions. Examples of liquid electrolytes include lithium perchlorate in propylene glycol. Polymer electrolytes include, for example, the proton conductor family based on polyvinylpyrrolidone and other organic hetroatom bases incorporated into polymers, and the alkali ion conducting polymers of which polyethylene oxide is the best known in relation to electrochromic work. Examples of solid state ionic conductors that have been used as both ion sources and electrolytes include hydrated materials, for example $SiO_x$ and $MgF_2$, and super ionic conductors, for example sodium-b-alumina. Numerous other materials in all of the above classes have been used to fabricate electrochromic devices and are well known in the art. Each type has its own advantages and disadvantages in terms of uniform color across a device, low resistance to charge movement, ease of high volume fabrication, and robustness of the finished device. The prior art of this aspect of electrochemical device fabrication has been reviewed as well in U.S. Pat. No. 6,020,987 and references therein.

There are several consequences to the fact that coloring and bleaching are related to movement of charge within an electrochromic material. The optical density of an electrochromic material in its "opaque" state is a function of the charge passed through the material. An electrochromic material which exhibits a high degree of coloration/unit of charge flow through the material is considered a better electrochromic material than one that undergoes coloring to a lesser degree with the same unit charge.

The rate of coloring and bleaching in an electrochromic material seems to be a function of the rate of transport of cationic species within the device as a whole. In general, devices using protons as a cationic species having faster rates of coloring and bleaching than those using lithium, sodium, and other larger cationic species, all other factors being kept the same in a given device. When charge is passed into or removed from an electrochromic material during coloring (depending upon whether it is a cathodically or anodically coloring material), an emf arises across one or more of the interface regions of the device that opposes the direction of flow dictated by the applied emf of charged species within the device. A direct consequence of this is that the device must be operated at voltages exceeding the emf developed in these space charge regions to insure complete charge saturation of the device, and thus insure that maximum optical density is achieved.

Often, voltages well above the space charge reverse emf must be employed to attain acceptable rates of coloring to an acceptable level of contrast between bleached and colored states of the device. Excessive voltage, however, can lead to breakdown of the device as current passing through the device participates in electrochemical processes not related to coloring that result in the oxidation or reduction of constituents of the device and permanent alteration of the electrochromic material.

One aspect of electrochromic device fabrication employed to reduce the problem of high overvoltages is to fabricate the device with a non-polarizable counter electrode. Such an electrode is one that freely passes cationic species between the counter electrode and the electrolyte of the device without building up a space charge region at the interface. One example of a class of non-polarizable electrodes are electrodes made from the tungsten bronzes, long used in the art as non-electrochromic sources of counter ions.

Tungsten bronzes used as non-polarizable electrodes are crystalline materials of primarily tungsten oxide containing a mobile cationic species. The tungsten bronzes are not electrochromic, and in this respect are to be distinguished from cathodically coloring tungsten oxide electrochromic materials of the prior art. In general, the cationic counter ion species residing in the tungsten bronze is particular to the given electrochromic material with which it is used or a counter electrode. Other non-polarizable electrodes which have been employed include oxides based on iridium and vanadium.

Transparent ionic conductors based on tantalum oxide have also been employed as counter-electrodes. Examples of tantalum oxide counter-electrodes, which act as a source and sink of counter ions but do not participate in electrochromic coloration in the device, have been disclosed in U.S. Pat. No. 4,832,468 to Ito et al., U.S. Pat. No. 5,105,303 to Ilhage, and U.S. Pat. No. 5,831,760 to Hashimoto et al. Typical counter ions in these materials are protons and alkali metals such as sodium or lithium.

Non-polarizable electrodes permit an electrochromic device to operate at coloration rates governed by the nature of ion flow in the electrochromic layer used in the device, but do not enhance the degree of coloration in a device in which they are employed. In this respect they do not completely address the problem of slow coloration rates.

Some electrochromic materials, most notably organic materials, but also rhodium oxide-based materials, cycle between two different colored states. Some devices in which electrochromic materials may be employed, such as optical switches and shutters, require that the electrochromic material cycle between a "transparent" (low optical density state) and an "opaque" (or high optical density state). These devices must function across a broad optical spectrum. Materials which exhibit two (or more) high optical density states in only narrow spectral bands are generally not suitable for such applications.

A material in a high optical density state may achieve its high optical density by reflection, absorption, or a combination of reflection and absorption processes. It has been observed in some types of electrochromic materials that reflectivity is more related to crystallinity and the morphology of the material than composition of the material. Thus, single crystal tungsten oxide is reflective in the "opaque" state and transparent in the "bleached" state, while polycrystalline films of this material in the "opaque" state seem to operate by a mixture of reflection and absorption mechanisms. The "opaque" state of amorphous tungsten oxide films are thought to achieve their opacity primarily by light absorption. This distinction is important in applications such as switching devices, where absorption dissipates signal power, and electrochromic shutters on building windows, where absorbed visible light can be re-radiated out the back side of the shutter as heat, negating the purpose of shuttering the window.

Tungsten oxide is a typical cathodically coloring material that has been extensively studied. Iridium oxide is a typical anodically coloring material that has also been studied to a great extent. The properties of iridium and tungsten oxide electrochromic materials have been reviewed in Advances in Image Pickup and Display, vol. 5, ed. B. Kazan, Academic Press, 1982, pp 83–136.

Problems noted in this review relative to tungsten oxide devices include solubility in some electrolyte systems (leading to poor storage life) and cycling degradation, leading to short service life. Additionally, devices based on tungsten oxide that require both a high contrast ratio (defined below) between "transparent" and "opaque" states and a fast cycling time between the two states require operation at voltages that accelerate physical degradation of the device, for example loss of adhesion between the electrochromic layer and the front electrode.

Additional observations regarding the nature of tungsten oxide-based electrochromic materials are disclosed in Display Devices, chapt 5. Faughnan and Crandall, Springer-Verlag Berlin. The authors of this work teach that it is necessary to incorporate water into tungsten oxide-based films before they exhibit electrochromism. Films formed from gelation of aqueous tungsten oxide precursors display superior electrochromic properties than those formed by reactive sputtering techniques. These authors also observe that amorphous tungsten oxide films exhibit faster coloration than crystalline films. They suggest that this is because of more facile ion migration in the amorphous material than is possible in crystalline materials. They also note that the amorphous films display some loss of maximum optical density and density bandwidth relative to results obtained with polycrystalline films and single crystal materials.

Electrochromic devices have been predicated on these principals, thus in U.S. Pat. No. 4,889,414 to Rauh et al., an electrochromic device is disclosed in which a highly ordered polycrystalline tungsten oxide film is employed to act as a wavelength variable reflectance device. The wavelength of light reflected by the device is adjusted by regulating the amount of charge injected into the electrochromic material.

In their review of work done with iridium oxide-based electrochromic devices, the reviewers noted that the iridium oxide-based electrochromic material appeared more robust to mechanical and cycling degradation than tungsten oxide-based materials. Additionally, the iridium oxide-based material had a more neutral color, and executed color/bleach cycles at a faster rate than tungsten oxide-based materials. The reviewers also disclosed that the ultimate optical density, and the density developed by the material as a function of the unit of charge passed through the material (the so called coloration efficiency) is lower for the iridium oxide-based material than for the tungsten oxide-based material.

As noted above, iridium oxide-based materials are anodically coloring electrochromic materials. As with cathodically coloring materials, the mechanism by which the anodically coloring materials color is in dispute. Suggested mechanisms range over the same possibilities for anodically coloring materials as for cathodically coloring materials. While movement of ions into or out of iridium oxide-based materials seems to be important to the mechanism by which these materials undergo coloring; changing the species employed as a counter anion in the anodically coloring materials does not have as dramatic an effect on the coloring/bleaching cycle rate as it does in the case of the cathodically coloring materials.

As for the tungsten oxide-based materials, the iridium oxide-based materials require hydration before they are an effective electrochromic material. It has been suggested that the transport of anions into the material is an important factor in the coloring mechanism. Iridium oxide-based-materials seem to be insensitive to the nature of the anion employed to balance charge, thus sulfate, fluoride, and hydroxide media all appear to be equally effective counter ions. This has caused other investigators to suggest that the general insensitivity to electrolyte character makes it difficult to distinguish between an electrochromic process in which an anionic species is transported into the material to balance charge, and one in which a cationic species is transported from the material to balance charge during coloring.

The characteristics of merit in an electrochromic material are related to its ability to color and its durability. The characteristics that are usually of interest relative to a material's ability to color are: the maximum optical density achievable by the material; the contrast between minimum and maximum optical density; the rate at which the material can be cycled between bleached and colored states; and the current required to achieve a specific optical density in the colored state.

Maximum and minimum optical density, and contrast between the bleached and colored states can be determined using conventional optical densitometry methods, or by optical spectroscopy wherein the film density is expressed in either percent transmission units or in absorbance units.

The current required to reach a given level of coloring can be expressed as the Coloration Efficiency (CE) of the material. Coloration Efficiency is expressed as a function of the change in transmittance of a sample per unit charge passed through a unit area of an electrochromic layer according to the equation:

$$CE = \log(\tau_b \times \tau_c^{-1}) \times \Delta Q^{-1}$$

Where CE is coloration efficiency, $\tau_b$ and $\tau_c$ are the optical transmittance of the device in the bleached and colored states respectively, and $\Delta Q$ is the unit area coulombic charge passed through the device. As is conventional, optical transmittance is expressed as a percentage.

Percent transmittance is calculated in the common manner, by dividing the flux of the light passing through the device by that of the light striking the front side of the device. The expression $\Delta Q$ is calculated by measuring the amount of charge passed through the device to change it from a bleached to the colored state, and then dividing by the area of the electrochromic layer that has received that charge. Generally, coloration efficiency (CE) is expressed as the integrated change in optical density over a specified range of wavelengths (or change in optical density for a given spectral region) One spectral region of interest in electrochromic devices is the visible region which is defined as the range of wavelengths from 400 to 700 nanometers.

Durability of electrochromic films is generally determined by incorporating a specific electrochromic material into a device such as a shutter and subjecting it to numerous coloration/bleaching cycles under a variety of emf conditions. The number of cycles a device can undergo before it is degraded (usually determined optically) is one important parameter that can be determined in this manner. Another important characteristic that may be ascertained in this way is the ability of a material to sustain a high number of coloration/bleach cycles without losing contrast between the states. Still another characteristic is the ability of the device to maintain an optically dense state without the continued application of an emf. The ability of the device to be stored quiescent without degradation of the device (shelf life) is also an important characteristic which may be determined in this manner.

In general, a practical electrochromic device should be able to achive a large optical density increase (called contrast) between its bleached state and its colored state. It is desirable for devices to exhibit their maximum optical density at a low injected charge value, usually calculated in terms of unit area of electrochromic material. Practical electrochromic devices should operate over tens of thousands of cycles without degrading below usability, and should be able to withstand long periods of storage without degradation (the devices should be stable). Finally, as an extrinsic property, a device utilizing an electrochromic material should be able to achieve maximum optical density in time scales on the order of seconds to minutes depending upon the application and device size.

Researchers have found that, in terms of practical devices, maximum optical density is an intrinsic property of the electrochromic material. While greater density can be achieved by utilizing thicker films, thicker films must either be operated at higher over-voltages (voltages in excess of the minimum required to cause charge flow in the device) or require very long bleaching/coloration cycles. High over-voltages lead to irreversible secondary reactions occurring within the device. These secondary processes can lead to reduced contrast between high and low optical density states and a less durable device. Long cycle times for the coloration/bleach cycle yields devices which are not practical. In this respect, practical devices are therefore limited to a maximum film thickness and a material dependent maximum optical density in the opaque state.

In general, electrochromic materials which exhibit a high ratio of optical density increase per injected charge (high coloration efficiency) can be operated at low over-voltage potentials. This feature yields devices with longer cycle lives. Such materials generally afford devices which can achieve a high level of optical density and which have short coloring/bleaching cycle times. For these reasons, such materials are preferred in the construction of practical electrochromic devices.

Several practitioners skilled in the electrochromic arts have suggested that this problem could be addressed by constructing a device utilizing two electrochromic layers (one anodically and one cathodically coloring layer) stacked along the optical path of a single device, each layer augmenting the absorption characteristics of the other. An example of such a device is disclosed by Lampert in a review of electrochromic materials suitable for windows (Lampert, C. M., *Solar Energy Materials* 11 (1984) 1–27). In theory, this type of construction yields a device that increases the optical density achievable with a given charge passed through the device over what is possible in a device using a single electrochromic layer. This is particularly useful when fabricating shutter type electrochromic devices wherein colored state optical densities are desired that approach 20% or less transmittance. Additionally, a device with an electrochromic layer on both electrodes does not have a significantly greater optical density in the bleached state than a device using only one electrochromic layer and a transparent counter electrode.

Electrochromic materials may demonstrate absorption curves that are flat within a narrow spectral region, however, over a broad spectrum in general they exhibit absorption curves that are not flat. It is unlikely that two different materials can be found that perfectly augment each other across a broad spectral band. Thus, at best, two different electrochromic materials would only be additive within a given narrow spectral band. However, using this same concept, two different electrochemical materials may be superimposed to compliment each other, thus expanding the spectral range over which such a device might have useful function as a shutter. Such materials exhibit complimentary electrochromic behavior. In such a situation, each could also contribute to some small degree to the overall optical density of the device across a broader spectral region (each layer augmenting the absorption of the other) but the primary effect would be to expand the spectrum over which the device could function rather than to augment the density the device could achieve in a narrow region of the absorption spectrum.

In a device having two superimposed complimentary electrochromic layers, the coloring cycle also utilizes the ions migrating out of the anodically coloring layer to supply the ions required for charge balance in the cathodically coloring layer, thereby utilizing the movement of one charged species to increase the optical density of each electrochromic layer in the device, albeit to different effect across a spectral region. This method both increases the maximum optical density achievable with the device and reduces the time required to execute a coloring/bleaching cycle to or from a given optical density. The maximum optical density achievable by such a device is increased because within a given spectral band the optical density increase in each of the two electrochromic layers is added together.

The time required to execute a bleaching/coloring cycle is related to the diffusion rates of charged species in the electrochromic layers of a device. A device utilizing two complimentary electrochromic layers reduces this time for two reasons. The first process by which a device with complimentary electrochromic layers reduces cycle time also relates to the optical density of the two electrochromic layers being additive. In such a case, the amount of charge which must be moved to achieve a given density across the whole device is less than would be required in a device having a single electrochromic layer. Since less charge must be moved, the coloring/bleaching time is shorter.

The second reason that a device having complimentary electrochromic layers reduces the cycle time is related to the effect of moving charge within the device. As charge is moved during a coloring cycle, the space charge region increases across the device, and resistance to current passing through the device increases. Thus, as the device is colored to an increasing level, it takes increasingly longer to pass a unit charge through the device.

A plot showing unit charge passed/unit time as a function of total amount of charge moved within a material would give a curve of decreasing value of charge moved/unit time as increasing amounts of charge were moved for a given applied emf (basically, as the charge is built up in the space charge region there is greater resistance to additional charge flow). A device having two electrochromic layers operates in a lower net moved charge end of this curve (wherein less total charge has been moved, thus the resistance to movement of charge is relatively low and charge transport is more facile). This means that coloration/bleaching cycles requiring a total movement of charge within two different layers occurs over a shorter period of time than moving the same amount of charge in a device having a single electrochromic layer for a transition from a bleached state to any given optical density. While this notion has been shown to be promising, problems related to slow cycle rates still exist with the prior art materials.

Materials disclosed or suggested in the prior art to address the problems posed by electrochromic materials which either compliment or augment each other (or both compliment and augment each other to varying degrees) only achieve either end over a narrow spectral range. The basis of the problems displayed by prior art materials rest with the requirements which must be met for electrochromic materials to be complimentary. For an anodically coloring material to be complimentary to a cathodically coloring material, the two materials must have several complimentary properties. The two materials must be complimentary in terms of optical properties, in terms of ionic species transported by the electrochromic material in undergoing a bleaching/coloring cycle, and in terms of having approximately the same coloration efficiencies. When these characteristics are matched in a given device, the device will achieve maximum optical performance from the electrochromic materials utilized. These multiple characteristics are described herein by the phrases "broadband optically complimentary," "ionic species complimentary,' and "coloration efficiency complimentary" behavior.

The concept of an "broadband optically complimentary" material has not been heretofore addressed by any of the prior art. Broadband optically complimentary electrochromic materials exhibit absorption spectra such that for a given spectral band the sum of the absorbances of the two materials across that spectral band is approximately constant. In such a situation, the areas of decreased absorption efficiency in one material coincide with areas of increased absorption efficiency in the other material.

This is best illustrated with reference to FIG. 9. FIG. 9 shows optical transmittance as a function of wavelength for a tungsten oxide, a cathodically coloring electrochromic material, and nickel tantalum oxide, an anodically coloring electrochromic material. The transmission spectra of these materials after receiving similar amounts of electrochemically injected charge are overlayed. It can be seen that where the cathodically coloring material has high transmittance, the anodically coloring material exhibits low transmittance, and vice-versa, illustrating broadband optically complimentary materials.

Two materials can be said to be "ionic species complimentary" if during a coloration/bleach cycle ionic current flow for both materials is in the same direction and the electronic current flow for both materials is in the same direction. By way of illustration, an electrochromic device employing a cathodically coloring material and an anodically coloring material can be expressed as the following sum of half reactions:

$$Li_{y+z}WO_x(\text{colored})$$
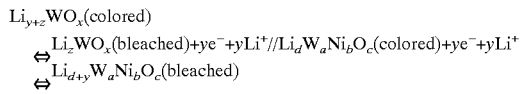
$$\Leftrightarrow Li_{d+y}W_aNi_bO_c(\text{bleached})$$

Where $WO_x$ is a tungsten oxide-based electrochromic material and $W_aNi_bO_c$ is a tungsten-doped nickel oxide-based electrochromic material. In this illustration, during a coloring cycle, the electrode in contact with the tungsten-doped nickel oxide electrochromic material acts as an anode, supplying electrons to the battery driving the electrochromic change via the conductor in contact with the electrochromic material. The doped nickel oxide-based electrochromic material itself acts as an ion source, supplying lithium to the tungsten oxide-based electrochromic material. Both the tungsten-doped nickel oxide and the tungsten oxide-based electrochromic materials undergo coloring in the process. The electrode attached to the tungsten oxide-based electrochromic material acts as a cathode, accepting electrons from the battery driving the electrochromic change and in turn supplying them to the tungsten oxide-based electrochromic material. The tungsten oxide-based electrochromic material itself acts as an ion sink, accepting lithium ions from the doped nickel oxide-based electrochromic material. Although this process is generally driven by a battery, any emf source wherein the positive pole of the emf was attached to the electrochromic device anode and the negative pole of the emf device was attached to the electrochemical device cathode drives such a device from a bleached to a colored state. Reversing this connection drives the material from a colored to a bleached state.

In this example, the materials are "ionic species complimentary" in that one ejects lithium at the same time the other injects it during the coloring/bleaching cycle. It would be possible to fabricate a device in which an intermediary ion conductor was used to essentially isolate the half reactions, making it possible for different ionic species to be used in each electrochromic layer to balance charges, but in such a situation the electrochromic materials could not be said to exhibit "ionic species complimentary" behavior. It is also a requirement that materials can only exhibit "ionic species complimentary" behavior if one of them exhibits anodically coloring behavior and the other exhibits cathodically coloring behavior. No "ionic species complimentary" behavior is possible if two materials both color anodically or both color cathodically.

With reference to FIG. 3, the absorption curves of prior art anodically coloring electrochromic materials based on nickel oxide and tungsten nickel oxide are compared with a cathodically coloring electrochromic material based on tungsten oxide according to their coloration efficiency. Coloration efficiency has been defined above.

Tungsten oxide is an electrochromic material frequently employed in electrochromic devices. It can be seen from an examination of FIG. 3 that although relatively flat, the coloration efficiency of the nickel oxide is poor across the wavelengths spanning the violet through the red portion of the visible light spectrum, and as stated above is poorly matched to Tungsten oxide, which has a coloration efficiency about 2–10 times that of the nickel oxide in the spectral region between 400–700 nm (visible spectrum). Tungsten nickel oxide has a better coloration efficiency in the blue region of the spectrum than either tungsten oxide or nickel oxide, but falls off in the yellow to red region as tungsten oxide increases in coloration efficiency. All materials are poor absorbers in the ultraviolet and blue end of the visible spectrum. In the particular example given, a device using a tungsten-doped nickel oxide-based electrochromic material in conjunction with a tungsten oxide-based electrochromic material would exhibit "ionic species complimentary behavior" but not "optical complimentary behavior" or "coloration efficiency complimentary behavior". Devices utilizing this material in a device employed to shutter sunlight, for example, would operate poorly in this region as they would change the color of the transmitted light as a function of the depth of coloration of the electrochromic device.

The concept of anodically and cathodically coloring electrochromic materials employed in the same optical pathway of an electrochromic device has been disclosed in the prior art. Thus U.S. Pat. No. 5,777,780 to Terada et al. disclose a sealing system which can be used with any type of electrochromic device, including ones that employ anodically and cathodically coloring electrochromic materials in the same optical path. This patent discloses compositions used for sealing such devices. The patent provides examples of electrochromic devices prepared by reactive sputtering of iridium onto a transparent electrode to form a film of hydrated iridium oxide. A tantalum oxide layer is then applied to the iridium oxide layer by vacuum deposition from a tantalum oxide source. This layer acts as a counter ion sink/source for electrochromic changes in the device. A second electrochromic layer based on tungsten was then deposited followed by another layer of transparent conductive material. This device was not tested for complimentary electrochromic behavior as that term is defined and disclosed elsewhere in this document, only for raw ability to repeatedly undergo coloring/bleaching cycles. Additionally, this patent discloses a device using a single electrochromic layer based on tungsten oxide and a vacuum deposited layer of tantalum pentoxide as an ion source and counter electrode. This patent also discloses that the subject sealing system will work equally effectively with devices of other construction, including devices that employ intermediate layers containing tantalum pentoxide in mixtures with group 8 metal oxides and hydroxides or in mixtures with materials of known electrochromic behavior. It does not disclose how to make such materials, but teaches that in these constructs the tantalum pentoxide maintains a discrete crystalline nature in the mixtures and itself is not electrochromically active.

U.S. Pat. No. 4,889,414 to Rauh et al. disclose electrochromic devices which employ both anodically and cathodically coloring electrochromic materials. This patent discloses devices made of a variety of combinations of anodically and cathodically coloring electrochromic materials but does not address the question of broadband optically complimentary behavior and coloration efficiency complimentary behavior in the combinations of materials used, reciting material combinations on the basis of merely ionic complimentary behavior, which has been shown by earlier workers to be an inadequate basis upon which to select combinations of electrochromic materials for use in practical devices. The only tantalum containing electrochromic compounds disclosed are sulfide and selenide layered materials. All of the devices are directed to single crystal or highly oriented polycrystalline films.

Reissued U.S. Patent Re 34,469 to Cogan et al. also disclose an electrochromic device based upon a layer of anodically coloring electrochromic material and a layer of cathodically coloring electrochromic material superimposed in the optical path of the device. In the disclosed examples, tungsten oxide-based electrochromic material is the preferred cathodically coloring material disclosed. Anodically coloring electrochromic materials used in example devices include materials based on vanadate and chromate. This patent teaches that mixtures of tantalum oxide with a vanadate, or chromate, or mixed vanadate/chromate electrochromic anodically coloring material will also function in the disclosed device. Methods of making the metal oxide mixtures are not disclosed. Additionally they disclose that tantalum oxide may be used as a cation source/sink in the disclosed devices.

This patent addresses ionic species complimentary behavior and coloration efficiency complimentary behavior without addressing broadband optical complimentary behavior. In the examples presented, the vanadate and chromate based anodically coloring materials display coloration efficiency that is 1–10% that of the cathodically coloring tungsten oxide-based material. No evidence of broadband optical complimentary behavior is presented in the disclosed devices. This patent discloses that adequate films of the claimed composition may be formed utilizing any of the known film forming techniques, including sputtering, vapor deposition techniques of all types, and coating/precipitation techniques of all types.

Additionally, this patent discloses that any manner of injecting counter ions into an electrochromic precursor material will produce an equally satisfactory electrochromic material. Thus for example, exposing a metal oxide film to electrochemical redox processes employing lithium ions produces a material equally satisfactory as an electrochromic material to the same metal oxide film exposed to lithium vapor in a vapor infiltration process.

Other examples of mixed oxide-based electrochromic material have been reported. Thus U.S. Pat. No. 4,282,272 to Matsuhiro et al. disclose a device employing a single layer of tungsten oxide-based electrochromic material into which tantalum oxide has been. These investigators incorporate tantalum oxide into tungsten oxide films by vacuum evaporating a mixture of tungsten and tantalum oxide onto a substrate. No improvement in electrochromic behavior was noted, but improved heat stability of the resulting mixed oxide films.

U.S. Pat. No. 4,365,870 to Morita et al. discloses an electrochromic cermet of mixed tungsten oxide and tantalum oxide. This material is prepared by sputtering from a tungsten oxide target that supports a piece of tantalum metal as well. These workers noted that the space charge emf builds up less rapidly for a given charge passed through a device made from the mixed oxide cermet than for an equivalent device made from the tungsten oxide alone. This they equate with improved colored state stability and more rapid response.

Various techniques have been employed to form films of electrochromic material. One technique used frequently in early investigations is a mechanical application of a parent species to a substrate, such as spin or dip coating or spray drying material. An example of this is the preparation of electrochromic tungsten oxide-based films by spray-drying metatungstic acid ($H_6W_{12}O_{39}$) onto hot quartz. Using this method, films 2–5 micron thick and having systematically variable water content can be prepared.

Another technique used to prepare electrochromic films is electrochemically precipitating a coating of a precursor material onto an electrode, or electrochemically modifying an existing coating on an electrode. Thus, iridium oxide films have been prepared on transparent conductors starting with a coating of iridium metal applied to the conductor using an evaporative coating process. The electrode (iridium on transparent conductor) was then subjected to oxidation in an electrochemical process using sulfuric acid as an electrolyte to form an iridium oxide film. The film was subjected to further electrochemical processing to injection cations into the iridium oxide film, thereby rendering it electrochromic. This has been carried out using transparent electrodes such as indium tin oxide coated glass.

Electrochromic layers have also been prepared utilizing conventional thin film vacuum preparation techniques such as sputtering, coating by evaporation of a source material, and chemical vapor deposition. Electrochromic films deposited in this manner include $V_2O_5$, $MoO_3$, $Nb_2O_3$, and $IrO_2$.

Hydrated nickel oxide has been known for some time as an anodically coloring electrochromic material. Its electrochromic properties have been studied and reviewed (Lampert, "Electrochromic Materials and Devices for Windows," *Solar Energy Materials*, 11 (1984) pg 16). It has been disclosed that nickel oxide films with lithium injected electrochemically into them can be used to fabricate electrochromic devices. The native nickel oxide film is first bleached by electrochemical reduction of the material. Lithium ions migrate into the structure during reduction where they apparently participate in a restructuring of the film.

At some point during ionic species injection, maximum transparency of the film is achieved, and further reduction results in coloration of the film as additional lithium ions are inserted. The lithium ions inserted during the initial bleaching stage (reduction of the material) do not readily migrate from the material when it is subsequently subjected to an oxidation. Lithium ions inserted into the material after the point of maximum transparency are readily removed upon subsequent electrochemical oxidation of the lithiated nickel oxide film. This oxidation step is accompanied by a subsequent bleaching of the material.

Once prepared, the material can be cycled reversibly between colored and bleached states with the accompanying movement of lithium ions in and out of the electrochromic material. The migration of lithium ions out of the structure under reduction does not proceed past the point of maximum transparency unless extraordinary voltages are applied to the material (generally in excess of 4 Volts relative to Li). Thus, lithiated nickel oxide prepared in this manner defines an electrochromic material which exhibits anodic coloring.

The authors of this work, F. Decker et. al., *Electrochima Acta*, vol 37, 6, (1992), pp 1033–38, did not determine the stoichiometry of lithium ions to nickel metal centers in the nickel oxide films at the point the films changed from bleaching to coloring with further lithium ion insertion. They also noted that the rate of coloring and bleaching was tied to the rate of ion migration, which was thought to be relatively slow.

The authors of this work have further disclosed that an electrode prepared with a lithium ion injected nickel oxide thin film can be incorporated into an electrochromic device. The authors prepared a device using a lithiated nickel oxide counter electrode and a tungsten oxide electrode as the primary electrochromic material. As disclosed above, tungsten oxide is a cathodically coloring electrochromic material, in this case becoming optically denser upon reduction, and the subsequent migration of lithium into the material.

In this device, the lithium migrating into the tungsten oxide is the lithium which was ejected by the lithiated nickel oxide electrode during its oxidation. The net result is that both materials undergo coloring with the movement of a single electron and a single lithium ion. This example device can not be operated as a practical device. The lithiated nickel oxide electrode requires current density far in excess of the tungsten oxide to undergo coloring or bleaching. In practice, a device made using a lithiated nickel oxide counter electrode would relegate the nickel oxide-based material to a role of primarily acting as a sink for lithium ions rather than as a significant contributor of optical density to the device. The authors also noted that slow kinetics also hamper the practical utility of this device. Apparently, because of the nature of the rate of charge transfer in the lithiated nickel oxide films, lithium transport in the device is slow, thus the transition time between the bleached and colored states is too long to be useful for practical applications.

Other workers have disclosed attempts to address the problem of slow coloring/bleaching cycle times in nickel oxide materials. Lee et. al. has disclosed a nickel oxide film which incorporates tungsten (Lee, Sh and Joo, S K, Solar Energy Materials and Solar Cells, 39 (1995), pp 155–66). These workers reasoned that incorporation of $W^{+6}$ atoms (which have an atomic radius similar to that of $Ni^{+2}$) would be facile and that doing so would result in two nickel vacancies for every tungsten incorporated into the nickel oxide lattice on the basis of charge neutrality.

On this basis, Lee and Joo prepared tungsten nickel oxide by reactive ion sputtering from a nickel target containing tungsten segments in an oxygen atmosphere (Lee, S H and Joo, S K, *Solar Energy Materials and Solar Cells*, 39 (1995) pp. 155–166). The tungsten nickel oxide thus produced was deposited onto a transparent conductor forming a tungsten-doped nickel oxide electrode.

The term doped material is applied herein when it is meant that the moiety referred to as a dopant is substitutionally incorporated into the structure of the material in which it is considered a dopant, and is part of the amorphous structure of the material into which it has been incorporated. As used herein, dopant materials are present in concentrations ranging from a fractional atomic percent to 50 atomic percent of the composition of the doped material.

When a tungsten-doped nickel oxide thin film electrode prepared according to the process of Lee and Joo was electrochemically injected with lithium ions, the resulting material was shown to be capable of anodically coloring. A device was prepared utilizing this material. The material colors upon oxidation with the subsequent ejection of lithium ions out of the electrochromic material. A second thin film electrochromic device was fabricated substituting the tungsten-doped nickel oxide-based counter electrode for a counter electrode based on a thin film of nickel oxide alone (no tungsten-doped into the nickel oxide). This electrode was also lithiated using the same procedure by which the tungsten-doped material was lithiated.

These two devices were compared electrochemically. It was observed that after the first lithium insertion cycle, the tungsten nickel oxide displayed a high lithium ion current at lower overpotentials than was required for the nickel oxide alone. Additionally, with reference to FIG. 3, the tungsten-doped nickel oxide electrode displayed a higher coloration efficiency (CE, defined above) than the undoped nickel oxide electrode.

Further study of the tungsten-doped nickel oxide films (Lee, S H; Park, Y S; and Joo, S K, Solid State Ionics, 109 (1998) pp 303–310) showed that the addition of tungsten to nickel oxide produced an electochromic material that executed coloring/bleaching cycles more rapidly than what is observed for undoped lithiated nickel oxide films. These investigators also noted that increasing the percentage of tungsten incorporated into nickel oxide films resulted in increasing electrical resistivity of the material, but the resistance of the material to ionic species migration, specifically the migration of lithium cations, was more facile than that observed for the film of undoped nickel oxide.

In further investigatory work, a tungsten-doped nickel oxide anode was used to fabricate an electrochromic device and compared with a similar device utilizing an undoped nickel oxide film. The device with the doped nickel oxide showed improved contrast between low and high optical density states, and displayed a more rapid coloring cycle than the undoped material.

Electrochromic devices fabricated with nickel oxide films as anodes do not execute a coloring/bleaching cycle sufficiently rapidly or at sufficiently low enough over-potentials to be commercially viable. Further, the performance characteristics of undoped nickel oxide films preclude their use as an electrochromic material that can contribute in a meaningful way to the overall contrast of the device when used in conjunction with a cathodically coloring electrochromic film.

Although the tungsten-doped nickel oxide films show improvement when compared with the undoped nickel oxide films, the devices assembled with them to date exhibit less than desirable performance characteristics when used in conjunction with cathodically coloring materials such as tungsten oxide. In such devices, optimum coloration efficiency complimentary behavior, and optimum broadband optical complimentary behavior are lacking, adversely effecting the performance of the device.

The present invention addresses the problems of slow ion transport kinetics and low coloration efficiency not addressed by these other materials. The present invention additionally provides a material that can exhibit broadband optical complimentary behavior, ionic species complimentary behavior, and coloration efficiency complimentary behavior when used in conjunction with anodically coloring prior art electrochromic materials.

DISCLOSURE OF INVENTION

One aspect of the present invention is the production of an electrochromic material that will cycle from a condition of low optical density to a condition of high optical density when employed as an anode in an electrochemical device.

Another aspect of the present invention is to produce a thin film of electrochromic material with a controlled ratio of constituents.

Another aspect of the present invention is to produce an electrochromic material that is the optical and electrical compliment of a tungsten oxide electrochromic material.

Other aspects of this invention will appear from the following description and appended claims, reference being made to the accompanying drawings forming a part of this specification wherein like reference characters designate corresponding parts in the several views.

BRIEF DESCRIPTION OF DRAWINGS

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

BEST MODE FOR CARRYING OUT THE INVENTION

Figure 1:
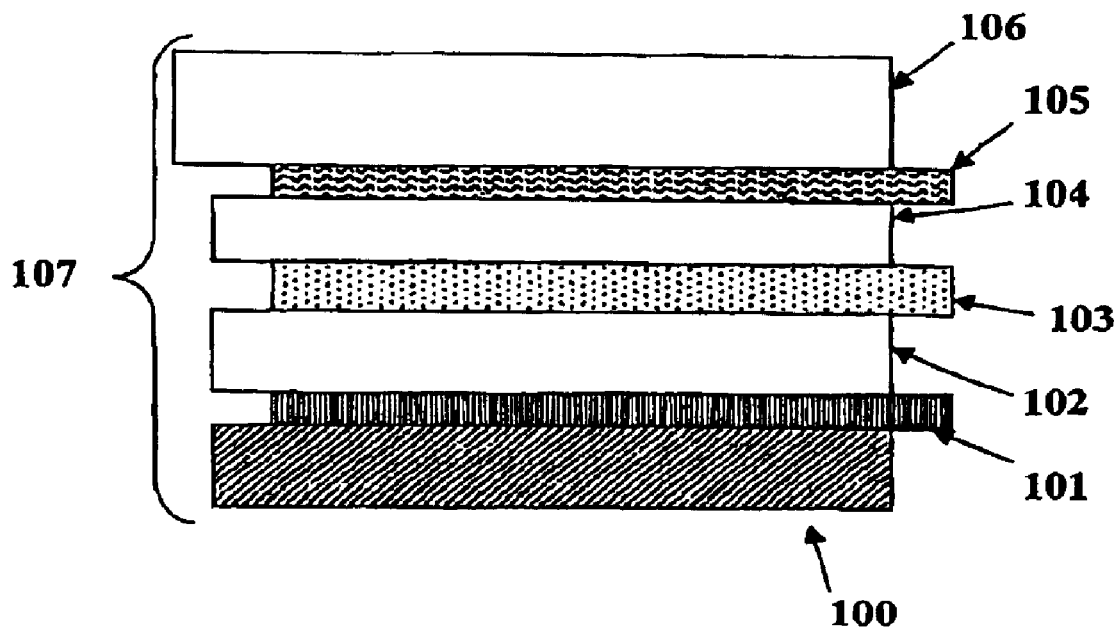
FIG. 1 A Cross-sectional Diagram of the Layers Comprising an Electrochromic Device.

One of the problems associated with electrochromic materials to be utilized in a practical electrochromic device is related to the speed with which the device executes a cycle from minimum to maximum optical density, or from maximum to minimum optical density, the so called coloring/bleaching cycle. The problem is particularly acute in materials that utilize the movement of cations larger than hydrogen to achieve charge balance within electrochromic materials cycling between bleached and colored states. Since the performance of many of the anodically coloring electrochromic materials is rendered unsatisfactory by the presence of water, a device incorporating such materials of necessity must use counter ions larger than protons.

While the speed of a coloring/bleaching cycle can be altered over some range by increasing the voltage across the electrodes of the device, increased voltage is associated with decreasing lifetimes for the device. Even under the condition that this decreased lifetime is acceptable, because of the development of a space charge region in the device during coloring, gains in coloring/bleaching cycle rates can only be modest when attempting to drive coloring of an electrochromic layer to an optical density exceeding 25% absorption by increasing the overpotentials of the driving voltage source.

The material of the present invention is an anodically coloring electrochromic material that addresses these problems. Using the definitions of complimentary electrochromic materials developed above, the material of the present invention exhibits electrochromic behavior that is complimentary to some commonly employed cathodically coloring electrochromic materials, such as tungsten oxide-based electrochromic materials. Without wanting to be bound by theory, the material of the present invention is believed to undergo electrochromic coloring when the material undergoes oxidation with the accompanying migration of cations out of it. The material of the present invention exhibits ion mobilities that exceed other prior art anodically coloring materials by a factor of 1–2 orders of magnitude, the rate seen for other materials.

Metal oxide films were prepared according to the process of the present invention having Ta incorporated into the oxide film to a level of from about 5 to about 60 atomic % relative to the amount of nickel incorporated into the film. These concentrations were verified by X-ray Photoelectron Spectroscopy (XPS), performed using a Physical Electronics PHI 5600 (a commercially available piece of analytical equipment) and standard procedures well known to those skilled in the art of ESCA analysis. The results of the XPS analysis show that Ta and Ni are incorporated into the oxide films of the present invention in the atomic ratio indicated.

The material of the present invention is characterized by the presence of tantalum substitutionally incorporated into an amorphous solid solution of predominantly nickel oxide. While any amount of tantalum may be incorporated into a nickel oxide film, tantalum incorporated at an amount of between about 5 at. % and 95 at. % is preferred. More preferred is tantalum incorporated to a level of between about 5 at. % and 60 at. %. X-ray diffraction spectroscopy (XRD) and Raman Spectroscopy (Raman) performed on films of the material of the present invention are consistent with such a characterization.

XRD data obtained from samples of the tantalum doped nickel oxide material was gathered using a Scintag X-1 diffractometer. The data thus obtained was subjected to θ/2q analysis, as will be familiar to those skilled in the art. The results of a typical XRD analysis obtained from films of the present invention Ta/Ni oxide is shown in FIG. 7.

Figure 7:
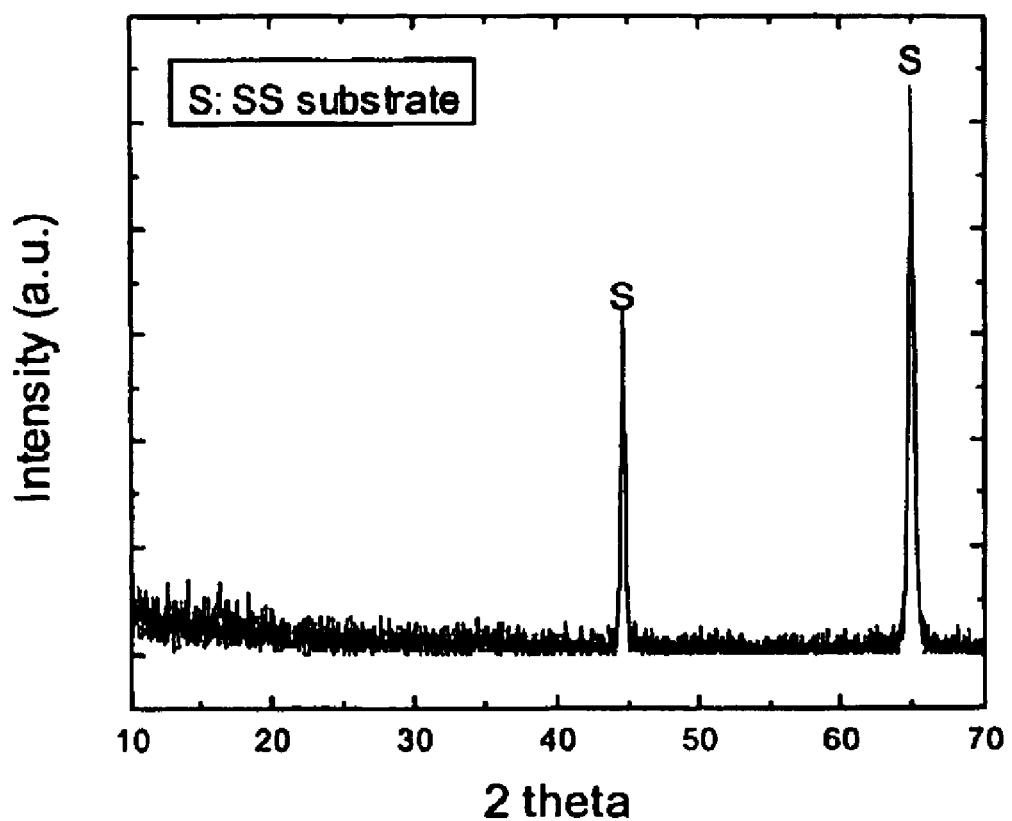
FIG. 7 X-ray Difraction Spectra of a Tantalum-nickel Oxide Film.

With reference to FIG. 7, the XRD analysis shows that the materials of the present invention lack the long range order that is observed in films of prior art metal oxide electrochromic materials. XRD analysis of materials of the present invention is also not consistent with a material having separate domains of the different crystalline metal oxides as an admixture. The data illustrates that this is not a mixture or phase separated mass of stoichiometric materials.

A Raman analysis, comparing films of a prior art crystalline nickel oxide and films of the present invention tantalum/nickel oxide also shows that the two materials are distinctly different. Raman analysis was performed using a quasi-backscattering geometry using as an excitation source the 514.5 nm line from a 150 mW Ar ion laser source which was focused to a 5 mm×100 µm area. The signal was dispersed by a Spex 0.6M triple spectrometer and detected with a liquid-nitrogen-cooled, high-resolution, charge-coupled-device detector array. Both the spectral resolution and the accuracy in the Raman shift are estimated to be ~2 cm$^{-1}$.

Figure 6:
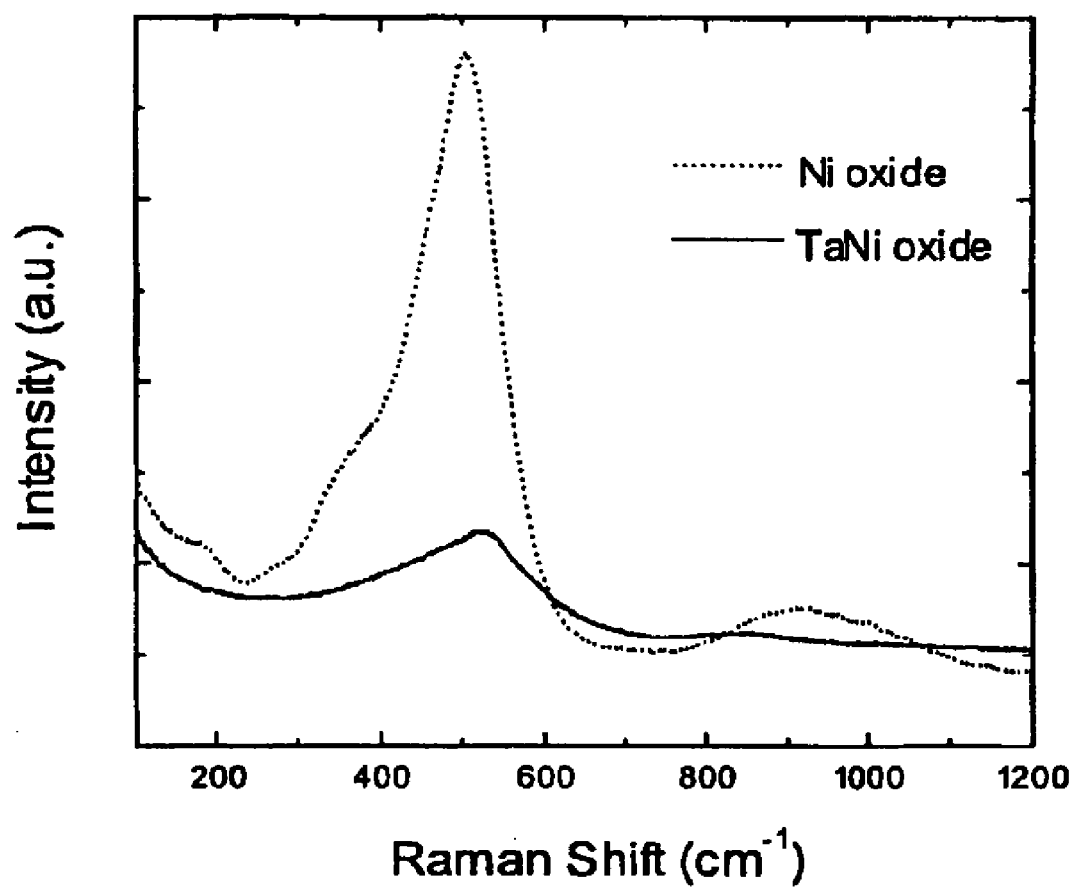
FIG. 6 Raman Spectra Comparison of Tantalum Nickel Oxide and Nickel Oxide Films

Raman spectroscopic comparison of a crystalline nickel oxide film and a Ni/Ta oxide film prepared according to the present invention are presented in FIG. 6. This spectral comparison demonstrates clearly that nickel exists in different environments in the two materials. It also demonstrates that the tantalum is incorporated into a single amorphous phase in the films of the present invention rather than as an admixture of separate tantalum oxide and nickel oxide phases.

Taken together, the Raman and XRD analysis demonstrate that the tantalum/nickel oxide films of the present invention are amorphous, and not a mixture of separate tantalum oxide and nickel oxide domains. This data is also consistent with the view that Ta is substitutionally incorporated into an amorphous nickel oxide.

The material of the present invention may be made by any means as is known in the art for applying a film or coating to a substrate. Thus, for example, the tantalum doped nickel oxide may be made by sputtering, reactive sputtering, vacuum evaporation, vapor deposition, chemical vapor deposition, spray drying, precipitation (particularly sol-gel techniques) or application of a metal coating followed by electrochemical oxidation of the coating. In all cases, once an oxide film has been formed on the electrode it is converted into an electrochromically active material by injection of a counter ion species into the film. In some methods of film preparation, such as electrochemical deposition, successive voltametric sweeps can be used to simultaneously form the film and inject counter ions into the newly formed film.

Figure 2:
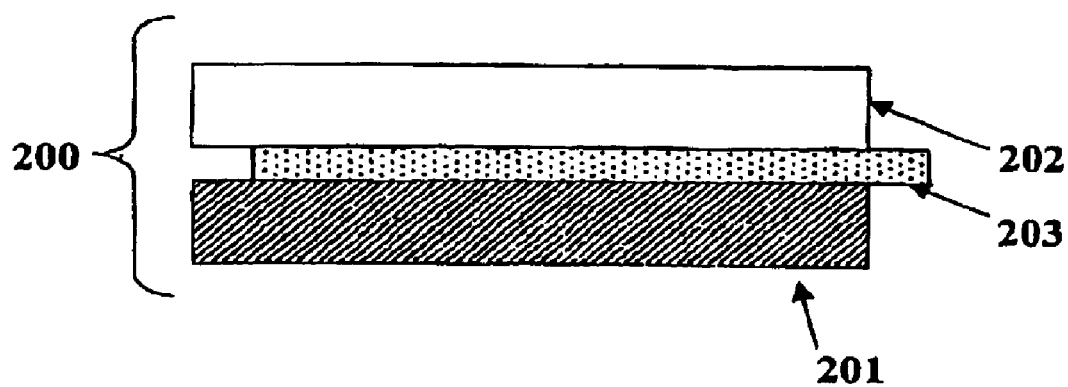
FIG. 2 A Cross-sectional Diagram of an Electrochromic Device Electrode
Figure 3:
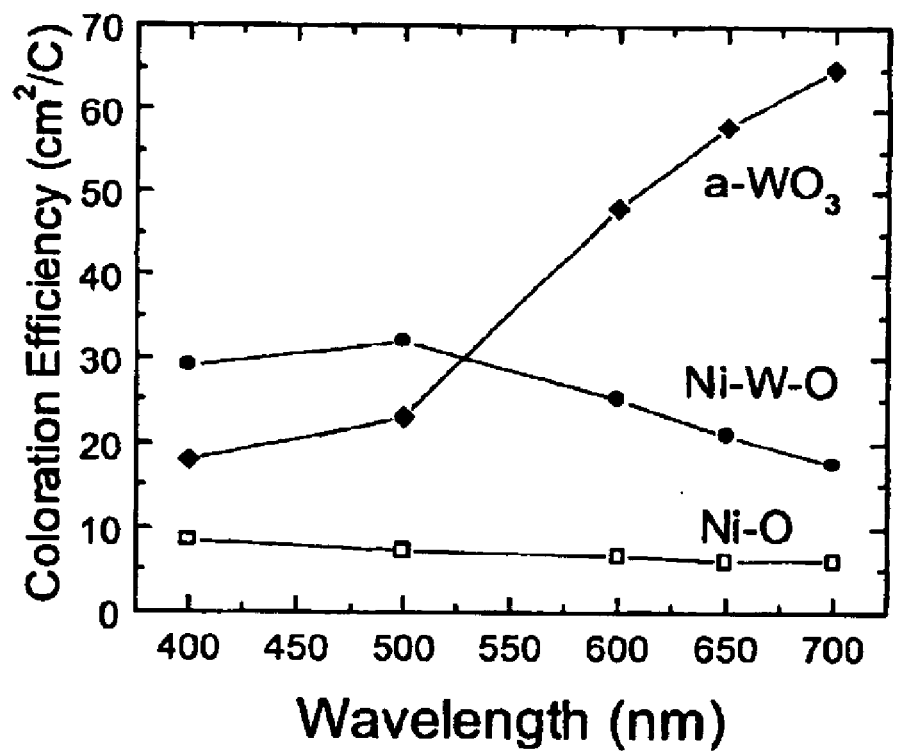
FIG. 3 Coloration Efficiency Comparison of Electrodes Resolved Across the Visible Spectrum.

The electrochromic properties of materials of the present invention were studied electrochemically using electrodes fabricated with a single electrochromic layer deposited on a conductive substrate. With reference to FIG. 2, electrodes 200 were constructed by applying a layer of the electrochromic material 202 onto a transparent conducting oxide (TCO) layer 203 which in turn resides on glass support 201. The transparent conductor was a sample of a transparent conductive oxide glass (TCO) obtained commercially. Transparent oxide conductors on glass are well known in the art, an example being indium doped tin oxide (ITO) glass. ITO glass was used in the example electrodes. One skilled in the art will appreciate that thin layers of metals, for example gold, may also be applied to a transparent support and serve as a transparent, conductive coating to glass.

The electrochromic material was deposited either by sputtering or by evaporative deposition, as detailed below.

Following deposition of an oxide used to form either an anodically or cathodically coloring electrochromic layer, the oxide layer was injected with cationic species electrochemically. To inject a counter ion metal species into the oxide layer of the electrode thus formed, the conductive substrate of the electrode was placed in ohmic contact with one pole of a source of voltage (emf source) which has facility for controlling the potential difference between two electrodes relative to a reference electrochemical potential. Any voltage source as is familiar to one skilled in the art is suitable. Such a voltage source is, for example, the Arbin Battery Testing System.

Once connected to the controllable emf source, the electrode is placed into a solution of a suitable salt containing the cation to be injected, for example lithium perchlorate.

Suitable solvents for cation species salts are, for example, propylene carbonate, dried over sodium metal/sodium benzophenone or lithum/sodium amalgam and distilled under inert atmospheric conditions, such as will be familiar to one skilled in the art. Other suitable solvents similarly dried will be readily apparent to one skilled in the electrochemical arts.

With one pole of the emf source connected to the electrochromic electrode, the other pole of the controllable voltage source is connected to an electrode comprising a source of the cation species to be injected, for example, lithium metal. The controllable voltage source is then cycled to a potential suitable to cause the counter ion species of interest to migrate into the oxide material, thereby producing the electrochromic material. The controllable voltage source is cycled between voltages greater than those sufficient to cause migration into the oxide material, and that sufficient to cause the material to achieve its maximum optically dense state. For example, when lithium is the counter ion (species ejected from the oxide material during coloring), the voltage is cycled between about 1.0 Volt positive of a lithium metal reference to about 4.0 Volt positive of a lithium metal reference.

Voltage cycling is continued until a stable cyclic voltamagram is obtained. Those skilled in the art will comprehend that a stable cyclic voltamagram indicates that the same quantity of charged species is being injected into the material during a reduction sweep as is being ejected from the material during a oxidation sweep of the voltage cycle.

When the material exhibits a stable voltamagram, typically about 10 cycles, the material is electrochemically cycled to either a bleached or a colored state, removed from the electrochemical cell, and studied spectroscopically as described above. These electrodes could also be returned to the electrochemical cell for repeated cycling between the states and removed again for further spectroscopic study.

The controllable emf source used affords the ability to measure the current passed into or out of the electrochromic device facilitating calculation of coloration efficiency as well.

Electrodes were prepared containing single layers of electrochromic materials according to the present invention and other materials having electrochromic properties as comparative examples. Once the oxide layers had been deposited they were connected to an Arbin Battery testing system, and placed into a propylene carbonate solution having lithium perchlorate present at between about 0.01 M and 10.0 M concentration. An Arbin Battery Testing system was used according to the procedure described above to cycle the electrochromic materials between voltages more positive than about 1.4 Volt positive of a lithium metal reference to about 4.0 Volt positive of a lithium metal reference until a stable cyclic voltamagram was observed. The material was then cycled to a voltage positive of lithium at which maximum current flow was observed during a reducing cycle (the reducing maxima) and held until no current flow was observed, injecting the electrochromic material with lithium ions and driving it to a bleached state. The electrochromic material thus prepared was then removed from the apparatus and used in spectroscopic testing. The electrochromic layer on the electrode was also subjected to a coloring cycle and the colored material was examined spectroscopically as well.

Electrochromic devices containing electrochromic layers of the present invention were typically prepared by depositing successive layers of material onto each other until all of the required layers were present in the device, as is well known in the art. To prepare a device, a combination of sputter deposition and vacuum evaporation was employed.

Thus, an electrochromic device having both an anodically coloring electrochromic layer and a cathodically coloring electrochromic layer was prepared by reactive ion sputter coating a layer of Ta doped NiO onto a sample of a transparent conductive oxide coated glass (TCO glass). By way of example, films were prepared by placing a 4" circular nickel metal target available from Superconductive Components, Inc. into a Varian 3-gun sputtering chamber. Coupons of 99.99% Ta metal, from ESPI, having a surface area of 3 in$^2$ each, were placed on the exposed face of the nickel disk until between about 5% to about 75% of the surface of the nickel disk was covered. The sputter target was placed about 7 cm from the sputtering gun. A sample of an indium tin oxide coated glass substrate having a resistance of 10 ohm cm, a material of commerce, was secured in the vacuum chamber a distance of 7 cm from the sputtering target. No active temperature control of the substrate was employed. The chamber was sealed and evacuated to about 0.001 millitorr. Once the chamber pressure had been stabilized, water free oxygen was admitted to the chamber to establish a pressure of about 10 millitorr. The substrate temperature was measured during the deposition using a thermocouple. The temperature of the substrate during deposition was found to be typically 40–50° C. Deposition of nickel/tantalum oxide was carried out by supplying Rf power to the sputter guns at a power density of about 150 watts across the sputter target. Power was maintained at this level until a film of typically 150 nm was formed on the substrate. The film thickness was monitored throughout the deposition using an Inficon thickness monitor. The ratio of Ta:Ni:O contained in the deposited film was measured by XPS according to the procedure described above.

Following this, a source of pure lithium metal was heated under vacuum and a film of lithium metal was deposited onto the exposed face of the TaNiO electrode. As the lithium formed on the surface it was taken up by the material giving the lithium metal injected electrochromic material of the present invention.

After sufficient lithium metal had been injected into the counter electrode thus formed, a layer of LiAlF4 was vacuum evaporated onto the exposed face of the counter electrode, forming a layer of electrolyte. A layer of tungsten oxide was then evaporated onto the exposed face of the electrolyte layer and a TCO layer was sputter coated onto the exposed face of the upper electrochromic layer. The TCO layer was deposited using a target of pure indium tin oxide and sputtering techniques as are familiar to one of ordinary skill in the art.

It will be apparent to one skilled in the art that as an alternative to Rf sputtering, DC sputtering techniques could be equally well employed to produce the subject electrochromic materials and TCO layer.

Following counter ion injection, the films were handled only in a controlled environment to preclude their exposure to water and oxygen. While examples are disclosed below in which Li$^+$ ions are used as counter ions, other ions, for example Na$^+$, H$^+$, and K$^+$, and others well known in the art may also be employed and still be within the scope of the present invention material.

Optical spectroscopy measuring the electrochromic properties of the films and electrochromic devices of the present invention and comparative examples was carried out using an Ocean Optics 001 Base32 spectrophotometer.

The Spectral response and coloration efficiency compatible behavior of electrochromic materials was determined by comparing the transmission spectra of a sample of a film or a device with a "blank sample." A "blank sample" transmission spectra was obtained as a baseline by recording the light intensity as the spectrometer was scanned through the range of wavelengths of interest with no sample present in the optical path of the spectrometer. In general, optical spectra were obtained over the wavelength of about 300 nm to about 1400 nm. The intensity of the light impinging on the detector was recorded at each wavelength across the spectrum as is well known in the art of obtaining a transmittance spectra. This procedure was repeated for a film or device, and the transmittance values for the subject film or device at a given wavelength were offset from a 100% line at that wavelength as established by the "blank" spectrum. In all cases the transmission spectrum was corrected for the response of the photodetector of the apparatus across the spectral region scanned.

The present invention may be further understood by reference to the following examples, which are provided for the purpose of illustration and not limitation of the scope of the present invention.

In the first set of examples, electrodes having a single layer of electrochromic material were prepared according to the above described procedures. Electrodes having anodically coloring electrochromic layers were subjected to electrochemical coloring and bleaching using the procedure described above. All example electrodes were examined in the bleached and colored states. The electrodes were cycled between bleached and colored states using the procedures described above. All analytical work was carried out using the above described procedures.

EXAMPLE ELECTRODES CONTAINING A SINGLE LAYER OF ELECTROCHROMIC MATERIAL

Example 1

A 5 atomic % tantalum doped nickel oxide film was deposited onto ITO glass from a 4" nickel sputtering target having 6% of its surface covered with tantalum metal coupons. Spectroscopic analysis of the resulting film showed that tantalum was substitionally incorporated into an amorphous nickel oxide matrix. The film was subjected to lithium ion injection according to the electrochemical procedure described above. It was found to have reversibly incorporated 5 mC/cm$^2$ lithium ions. The lithiated film was subjected to coloration/bleaching cycles in an electrochemical cell. The colored film was examined spectroscopically according to the above detailed procedure and found to have a peak wavelength coloration efficiency of 20 cm$^2$/C at 400 nm.

Example 2

An amorphous film comprising 25 atomic % tantalum doped into nickel oxide was deposited onto ITO glass from a 4" nickel sputtering target having 30% of its surface covered with tantalum metal coupons. The deposition was carried out according to the procedure described above. The composition and nature of the film was confirmed by spectroscopic analysis as described above. The film was subjected to lithium ion injection according to the electrochemical procedure described above. It was found to have reversibly incorporated 15 mC/cm$^2$ lithium ions. The lithiated film was subjected to coloration/bleaching cycles in an electrochemical cell. The colored film was examined spectroscopically according to the above detailed procedure and found to have a peak wavelength coloration efficiency of 55 cm$^2$/C at 400 nm.

Example 3

An amorphous film containing 60 atomic % tantalum doped into nickel oxide was deposited onto ITO glass from a 4" nickel sputtering target having 72% of its surface covered with tantalum metal coupons. Deposition was carried out according to the procedure detailed above. The composition and nature of the film was confirmed by spectroscopic analysis as described above. The film was subjected to lithium ion injection according to the electrochemical procedure described above. It was found to have reversibly incorporated 10 mC/cm$^2$ lithium ions. The lithiated film was subjected to coloration/bleaching cycles in an electrochemical cell. The colored film was examined spectroscopically according to the above detailed procedure and found to have a peak wavelength coloration efficiency of 25 cm$^2$/C at 400 nm.

Comparative Example 4

An ordered nickel oxide film having an average stoichiometery corresponding to $NiO_{1.5}$ was deposited onto a sample of indium tin oxide glass from a 4" nickel sputtering target according to the procedures described above. The composition and nature of the resulting film was confirmed by spectroscopic analysis as described above. The film was subjected to lithium ion injection according to the electrochemical procedure described above. It was found to have reversibly incorporated less than 5 mC/cm$^2$ lithium ions. The lithiated film was subjected to coloration/bleaching cycles in an electrochemical cell. The colored film was examined spectroscopically according to the above detailed procedure and found to have a peak wavelength coloration efficiency of 10 cm$^2$/C at 400 nm.

Comparative Example 5

An ordered tungsten oxide film having a stoichiometry corresponding to $WO_{2.9}$ was deposited by reactive ion sputtering onto a sample of indium tin oxide glass from a 4" tungsten sputtering target according to the procedures described above. The composition and nature of the resulting film was confirmed by spectroscopic analysis, as described above. The film was subjected to lithium ion injection according to the electrochemical procedure described above. It was found to have reversibly incorporated less than 15 mC/cm$^2$ lithium ions. The lithiated film was subjected to coloration/bleaching cycles in an electrochemical cell. The colored film was examined spectroscopically according to the above detailed procedure and found to have a peak wavelength coloration efficiency of 55 cm$^2$/C at 650 nm.

Comparative Example 6

A film containing 25 atomic % tungsten doped into nickel oxide was deposited onto ITO glass from a 4" nickel sputtering target having 30% of its surface covered with tungsten metal coupons. The composition and nature of the film was confirmed by spectroscopic analysis, as described above. The film was subjected to lithium ion injection according to the electrochemical procedure described above. It was found to have reversibly incorporated 20 mC/cm$^2$ lithium ions. The lithiated film was subjected to coloration/bleaching cycles in an electrochemical cell. The colored film was examined spectroscopically according to the above detailed procedure and found to have a peak wavelength coloration efficiency of 30 cm$^2$/C at 400 nm.

Figure 4:
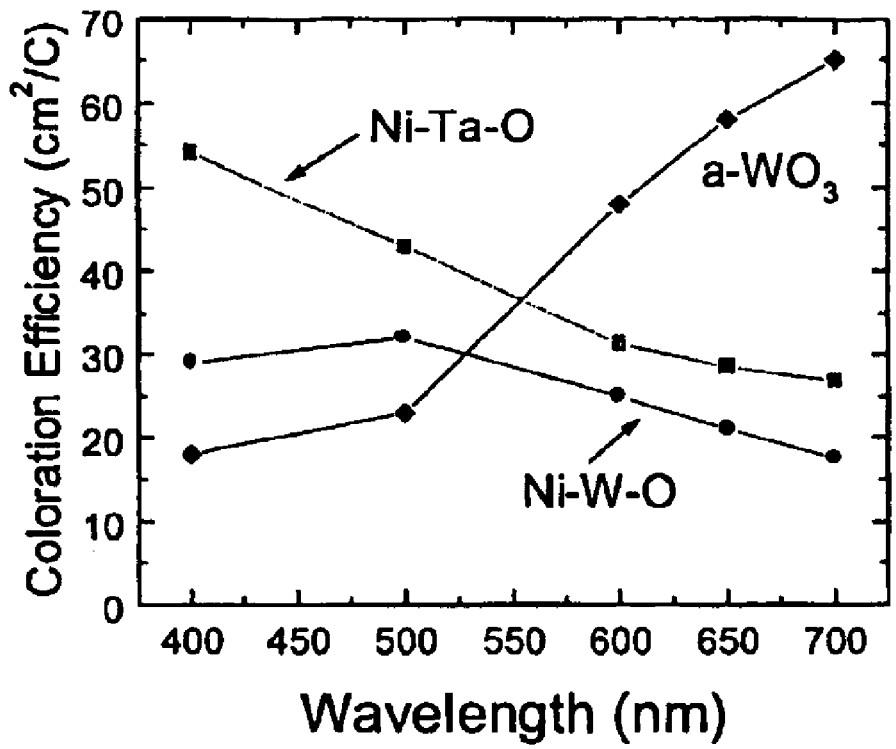
FIG. 4 Spectroscopic Comparision of the Coloration Efficiency of Tungsten Oxide, Tungsten Nickel Oxide and Tantalum Nickel Oxide Electrodes.
Figure 5:
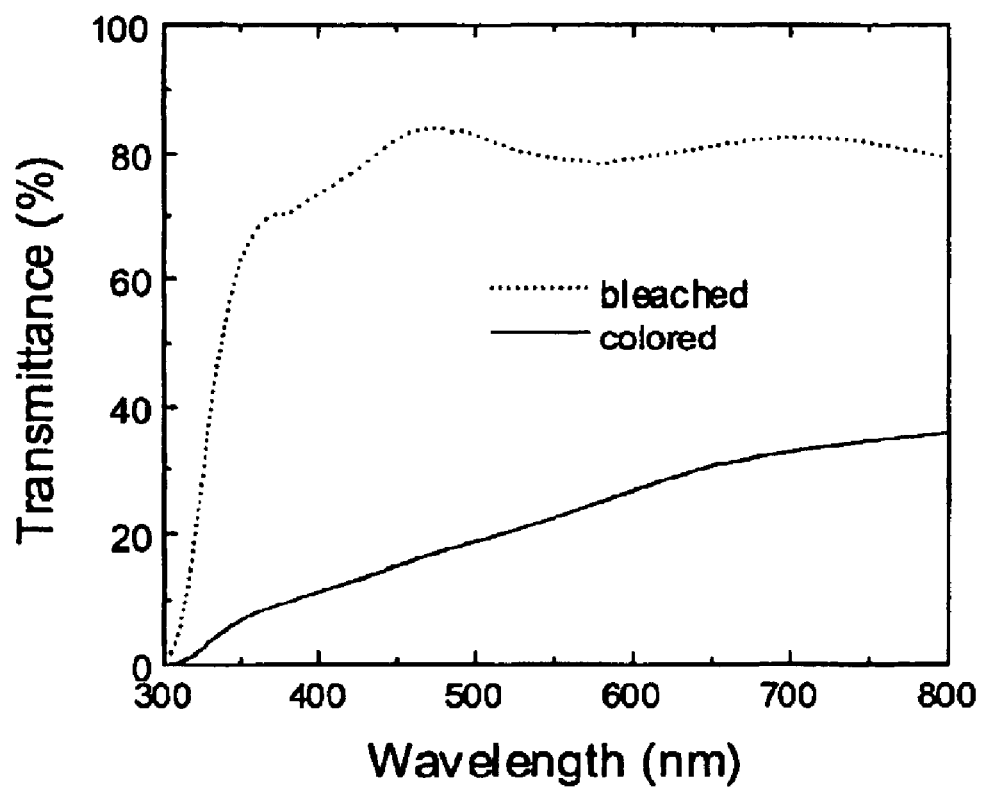
FIG. 5 Visible Spectrum Analysis of a Tantalum/nickel Oxide Film.

Films made according to Examples 2, 5, and 6 were subjected to a coloration cycle in an electrochemical cell according to the procedure described above. These materials were compared in their colored states by optical spectroscopy. The results from the three electrodes are shown superimposed in FIG. 4. Examination of FIG. 4 shows that the material of the present invention has higher coloration efficiency than the tungsten nickel oxide across the spectrum. Of equal importance, FIG. 4 shows that the material of the present invention has nearly the same coloration efficiency in the blue region of the spectrum as a tungsten oxide material exhibits in the green through red region of the spectrum. Additionally, FIG. 4 shows that the material of the present invention (tantalum nickel oxide) has an absorption curve which falls off symmetrically with the rise in absorption seen in the tungsten oxide-based material. This demonstrates that an electrochromic device fabricated with a tantalum doped nickel oxide electrode of the present invention and a tungsten oxide electrode would provide a shutter having a flat absorption curve across the visible spectrum. This demonstrates broadband optical complimentary behavior. Both of the tungsten oxide (cathodically coloring material) and the tantalum nickel oxide (anodically coloring material) have similar coloration efficiency. In this manner, the coloration efficiency complimentary behavior of these materials is demonstrated. Since both materials use lithium as a counter ion, ionic species complimentary behavior is also demonstrated.

Electrochromic Devices

Electrochromic devices were fabricated that contained both anodic and cathodic coloring electrochromic layers. The devices were prepared by sequentially depositing the various layers required in the device. With reference to FIG. 1, example devices 107 were fabricated utilizing a commercial sample of ITO glass as support 100 and transparent conducting layer 101. Onto layer 101 was deposited a 1500 angstrom thick layer of an anodically coloring electrochromic material as a counter electrode layer 102. The material was deposited by sputtering from an appropriate target using the same technique as described above for electrochromic electrodes prepared for electrochemical study. The counter electrode layer was infused with a sufficient quantity of lithium metal to supply the requirements of the device being fabricated by vacuum evaporation from a lithium source.

A 10,000 angstrom thick $LiAlF_4$ electrolyte layer 103 was then deposited onto the lithium infused counter electrode by vacuum evaporation from a pure source of $LiAlF_4$.

A 5000 angstrom thick cathodically coloring electorchromic layer 104 comprising tungsten oxide was deposited onto the exposed face of the electrolyte layer from a pure tungsten oxide source utilizing vacuum evaporation techniques as described above. Finally, a 3000 angstrom thick top conductive layer 105 comprising indium doped tin oxide was deposited by sputtering from a pure ITO source. A top protective layer 106 was not used in these example devices.

Example 7

An electrochemical device was prepared according to the sequence described above. The device of Example 7 was fabricated with an anodic coloring counter electrode comprising 25 atomic % tantalum incorporated into nickel oxide using a target prepared as described above in Example 2. The cathodically coloring electrochromic layer in this device comprised $WO_{2.9}$, prepared as described above in Example 5. This device was tested by connecting it to an Arbin Battery Testing System and measuring the charge required to cycle it between colored and bleached states and measuring its visible spectrum when in the bleached and colored states.

Example 8

Comparative Electrochromic Device

A second electrochromic device was prepared according to the sequence described above. The device of example 8 was fabricated with an anodic coloring counter electrode comprising $NiO_{1.5}$ prepared as described above in Example 4. The cathodically coloring electrochromic layer in this device comprised $WO_{2.9}$, prepared as described above in Example 5. This device was tested by connecting it an Arbin Battery Testing System and measuring the charge required to cycle it between colored and bleached states and measuring its visible spectrum when in the bleached and colored states.

Visible spectroscopy was used to compare the electrochromic devices prepared according to Examples 7 and 8 in both the colored and bleached states. The results for the two devices in each state are show superimposed in FIG. 8.

Figure 8:
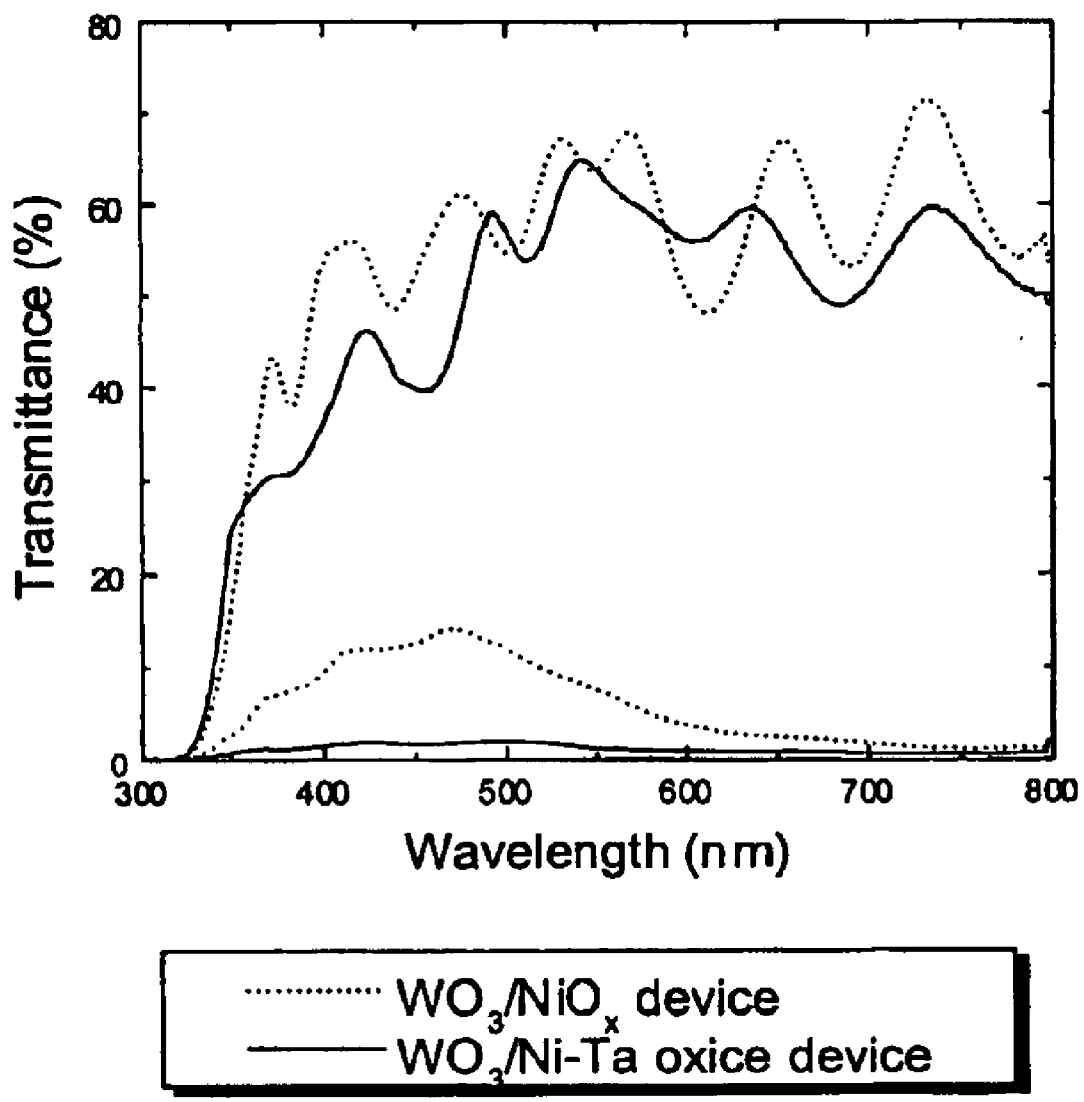
FIG. 8 Visible Transmittance Spectrum Comparison of Bleached and Colored States in an Electrochromic Device.
Figure 9:
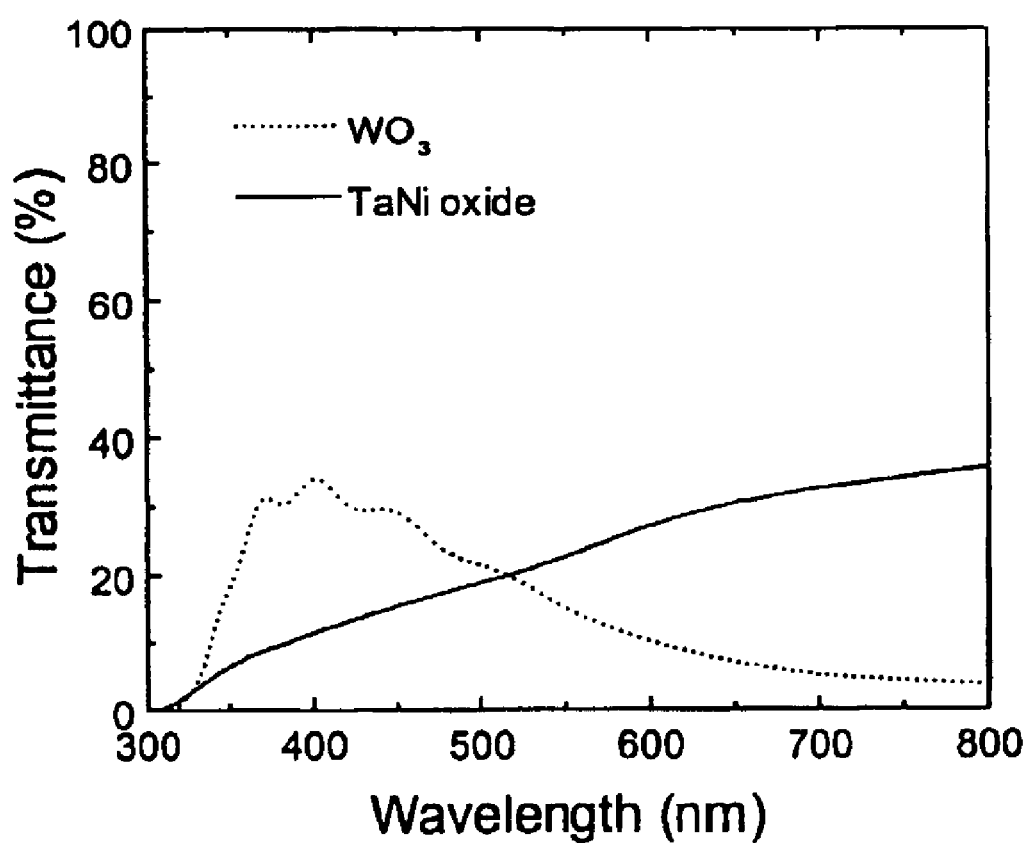
FIG. 9 Visible Transmittance Spectrum Comparison of Colored $Ta-nio_x$ and $Wo_x$ Films.

With reference to FIG. 8 it can be seen that in the red end of the spectrum, wherein absorption is primarly due to tungsten oxide electrochromism, the device incorporating the tantalum doped nickel oxide electrode performs equally regarding maximum optical density contrast, and coloration efficiency. It can as well be seen that in the green/violet/ultraviolet region of the spectrum, wherein absorption is primarily due to either the tantalum-doped nickel oxide of the Example 7 device, or the nickel oxide of the Example 8 device, the tantalum-doped nickel oxide material has superior performance regarding maximum density, contrast, and coloration efficiency.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A metal oxide capable of undergoing reversible lithium metal insertion, said metal oxide being characterized upon lithium ion insertion by electrochromism, lithium ion mobility under an applied emf that is substantially similar to that of electrochromic tungsten oxide, and a lack of long range crystal structure, said metal oxide comprising:

a first transition metal present as a stable, amorphous metal oxide matrix; and a second transition metal doped into said stable amorphous metal oxide matrix.

2. The metal oxide of claim 1 wherein, said first transition metal comprises essentially nickel and said second transition metal comprises essentially tantalum.

3. The metal oxide of claim 2, wherein the atomic ratio of tantalum:nickel is in the range of about 5:95 to about 95:5.

4. The metal oxide of claim 3, further comprising inserted lithium atoms.

5. The metal oxide of claim 1, further comprising inserted lithium atoms.

6. The metal oxide of claim 5, wherein said metal oxide electrochromism is characterized by anodic electrochromic coloring.

7. A thin metal oxide film capable of undergoing reversible lithium metal insertion residing on a transparent substrate, said thin metal oxide film being characterized by displaying, upon lithium metal insertion, reversible anodically coloring electrochromism, said thin metal oxide film comprising:

a first transition metal present as a stable amorphous metal oxide matrix; and a second transition metal doped into said stable amorphous metal oxide matrix.

8. The thin metal oxide film of claim 7, wherein said first transition metal comprises essentially nickel and said second transition metal comprises essentially tantalum.

9. The thin film of claim 8, wherein said first transition metal is present in the thin film in the range from about 5–95 atomic percent relative to said second transition metal.

10. The metal oxide of claim 9, further comprising inserted lithium atoms.

11. The metal oxide of claim 8, further comprising inserted lithium atoms.

12. The thin metal oxide film of claim 7, further comprising inserted lithium atoms.

13. A metal oxide film capable of undergoing lithium metal insertion, said metal oxide being formed on a substrate by reactive oxygen ion sputtering from a target containing both tantalum and nickel and having an atomic ratio of Tantalum:Nickel of between about 5:95 and about 95:5, and lacking any long range ordered structure as determined by XRD.

14. The metal oxide film of claim 13, wherein the ratio of Ta:Ni surface area in the sputtering target is between about 5:95 and about 95:5.

15. The metal oxide film of claim 14, wherein said substrate is a glass bearing a transparent conductive oxide coating selected from tin oxide and indium doped tin oxide.

16. The metal oxide film of claim 13, further comprising inserted lithium atoms.

17. An electrode containing a lithium metal injected metal oxide film layer, said metal oxide film layer being formed on a transparent glass substrate with a transparent layer of a conductive oxide interposed between said metal oxide film layer and said transparent glass substrate, wherein said metal oxide film is formed by reactive oxygen ion sputtering from a target containing both tantalum and nickel, and wherein said metal oxide film is subjected to a lithium metal injection process, said metal oxide film being characterized by the following properties:
  an atomic ratio of Tantalum:Nickel of between about 5:95 and about 95:5;
  an absence of any long range crystal structure as determined by XRD;
  electrochromic behavior such that said metal oxide film undergoes electrochromic coloring when connected to a cathode of an emf source having sufficient potential to drive said coloring and electrochromic bleaching when connected to the anode of an emf source having sufficient potential to drive said bleaching; and
  an electrochromic coloration efficiency of greater than 5 $cm^2/C$ measured at about 400 nm.

18. The electrode of claim 17, wherein the atomic ratio of Ta:Ni and the amount of lithium metal injected into said metal oxide film layer are selected to yield a cathodically coloring electrochromic electrode having broad band optical complimentary behavior, ionic species complimentary behavior, and coloration efficiency complimentary behavior with a tungsten oxide electrochromic electrode.

19. An electrochromic device, the device comprising:
  a glass support;
  a first conductive layer;
  a tantalum nickel oxide layer wherein said layer is formed by sputtering and injected with lithium;
  an electrolyte layer;
  a tungsten oxide layer, wherein said layer is formed by vacuum evaporation; and
  a second conductive layer in ohmic contact with said tungsten oxide layer.

20. The electrochromic device of claim 19 wherein said first and second conductive layers are indium doped tin oxide glass, and wherein said nickel tantalum oxide layer has a Ni:Ta ratio of between about 95:5 and about 5:95.

21. The electrochemical device of claim 19, wherein said nickel tantalum oxide layer and said tungsten oxide layer combination exhibit a broadband optical complimentary behavior, an ionic species complimentary behavior, and a coloration efficiency complimentary behavior.

22. An electrode containing a lithium metal injected metal oxide film layer, said metal oxide film layer being formed on a transparent glass substrate with a transparent layer of a conductive tin oxide interposed between said metal oxide film layer and said transparent glass substrate, and wherein said metal oxide film is formed by reactive oxygen ion sputtering from a target containing both tantalum and nickel, wherein said metal oxide film is subjected to a lithium metal injection process, said metal oxide film being characterized by the following properties:
  an atomic ratio of Tantalum:Nickel of between about 5:95 and about 95:5;
  an absence of any long range crystal structure as determined by XRD;
  electrochromic behavior such that said metal oxide film undergoes electrochromic coloring when connected to a cathode of an emf source having sufficient potential to drive said coloring and electrochromic bleaching when connected to the anode of an emf source having sufficient potential to drive said bleaching; and
  an electrochromic coloration efficiency of greater than 5 $cm^2/C$ measured at about 400 nm.

23. The electrode of claim 22 further comprising an atomic tantalum:nickel ratio of between about 5:95 and about 60:40.

24. The electrode of claim 22 wherein the conductive tin oxide is indium tin oxide.

* * * * *